United States Patent [19]

Hynds et al.

[11] Patent Number: 5,062,656
[45] Date of Patent: Nov. 5, 1991

[54] FLEXIBLE LINK ASSEMBLY FOR A VEHICLE SUSPENSION SYSTEM

[75] Inventors: Ernest J. Hynds; Keith A. Stowe, both of Saginaw; David C. Cook, Frankenmuth, all of Mich.

[73] Assignee: General Motors Corporation, Detroit, Mich.

[21] Appl. No.: 563,150

[22] Filed: Aug. 6, 1990

[51] Int. Cl.⁵ .................... B60G 21/00; B60G 11/22; F16F 1/16
[52] U.S. Cl. .................................. 280/689; 280/716; 280/723; 267/67; 267/160; 267/182
[58] Field of Search ............... 280/688, 689, 690, 716, 280/663, 664, 665, 723; 267/67, 160, 182

[56] References Cited

U.S. PATENT DOCUMENTS 4,690,234 9/1987 Takada .................. 280/665
4,703,947 11/1987 Tattermusch et al. ......... 280/665

Primary Examiner—Kenenth R. Rice
Assistant Examiner—Paul Dickson
Attorney, Agent, or Firm—A. Michael Tucker

[57] ABSTRACT

A link asssembly includes a jointed arm terminating in a barrel portion at one end and a collar portion at the opposite end. The barrel portion is mounted to a control arm by a fastener. The collar portion receives a tubular stabilizer bar. During operation, the jointed arm provides a working angle large enough to accommodate the movement between the stabilizer bar and the link assembly.

7 Claims, 2 Drawing Sheets

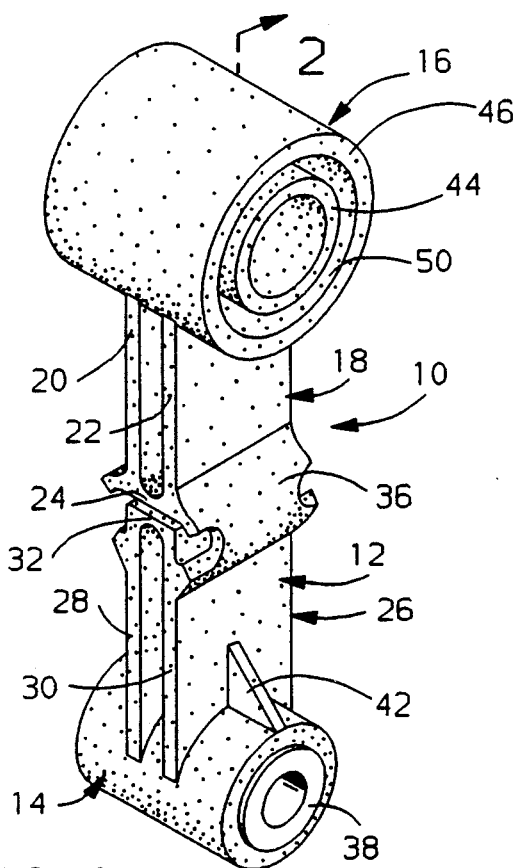
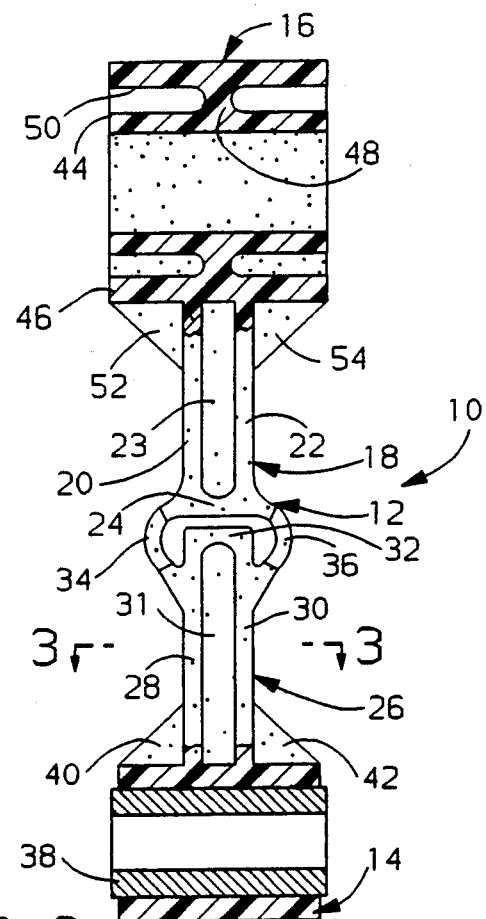
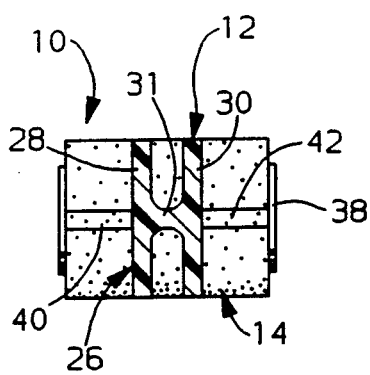
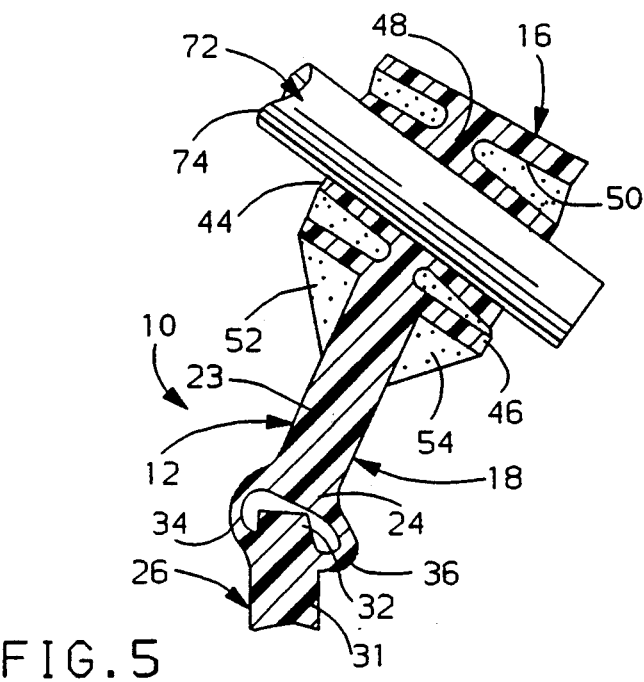

FLEXIBLE LINK ASSEMBLY FOR A VEHICLE SUSPENSION SYSTEM

BACKGROUND OF THE INVENTION

1. Field of the Invention

The present invention relates generally to vehicle suspension systems and, in particular, is concerned with a flexible link assembly connected between a control arm and a stabilizer bar.

2. Statement of the Related Art

The use of roll stabilizer bars in automotive wheel suspension systems is well-known. Generally, an end link is connected between a control arm and a stabilizer bar. When the control arm moves as a result of a road input, the end link transmits all or part of the movement to the stabilizer bar. The spring effect of the stabilizer bar is then transmitted through an opposite end link to a control arm on the other side of the vehicle to resist the rolling motion of the vehicle.

Conventional stabilizer bars terminate at each end in a paddle or eyeform with a hole to receive a bolt or threaded weld stud. The end link is placed on the bolt and secured with a nut. The end link often includes an elastomeric bushing and metal sleeve to permit the linkage to rotate relative to the stabilizer bar. During operation, the control arm pivots about a line through its attachment points to the frame. As a result, the connection point where the end link is attached to the control arm moves through an arc. A prior art method of allowing this movement to occur is to allow the end assembly to rotate relative to the control arm. Concurrently, the stabilizer bar pivots about a line through its attachment points to the frame. Therefore, the end link must also accommodate movement of an end of the stabilizer bar as the bar rotates due to road inputs.

The art continues to seek improvements. It is desirable to eliminate the costly eyeforms on the ends of the stabilizer bar. It is also desirable to eliminate the bolt or stud and nut that fasten the end link to the stabilizer bar. A new design for the connection between the stabilizer bar and end link must accommodate the relative motions between the end link and the stabilizer bar and the end link and the control arm.

SUMMARY OF THE INVENTION

The present invention provides an improved link assembly for connecting a rotatable stabilizer bar and a pivotable control arm. The improved link assembly eliminates the need to form an eyeform in an end of the stabilizer bar, thereby eliminating the need for a bolt and nut. Furthermore, the present link assembly can be molded from a suitable flexible and resilient material. A jointed arm deforms to accommodate the movement between the stabilizer bar and the link. The present end link assembly is suitable for use with conventional stabilizer bars and control arms.

In a preferred embodiment, the present link assembly includes a jointed arm terminating in a barrel portion at one end and a collar portion at the opposite end. The barrel portion is mounted to a control arm by a fastener. The collar portion receives a tubular stabilizer bar. During operation, the jointed arm provides a working angle large enough to accommodate the movement between the stabilizer bar and the link assembly.

BRIEF DESCRIPTION OF THE DRAWINGS

FIG. 1 is a perspective view of a link assembly according to the present invention.

FIG. 2 is a sectional view taken along Line 2—2 of FIG. 1.

FIG. 3 is a sectional view taken along Line 3—3 of FIG. 2.

FIG. 5 is a sectional view of the link assembly of FIG. 1 mounted on a stabilizer bar illustrating a deformed state due to rotation of the stabilizer bar.

DETAILED DESCRIPTION OF THE PREFERRED EMBODIMENT

Figure 4:
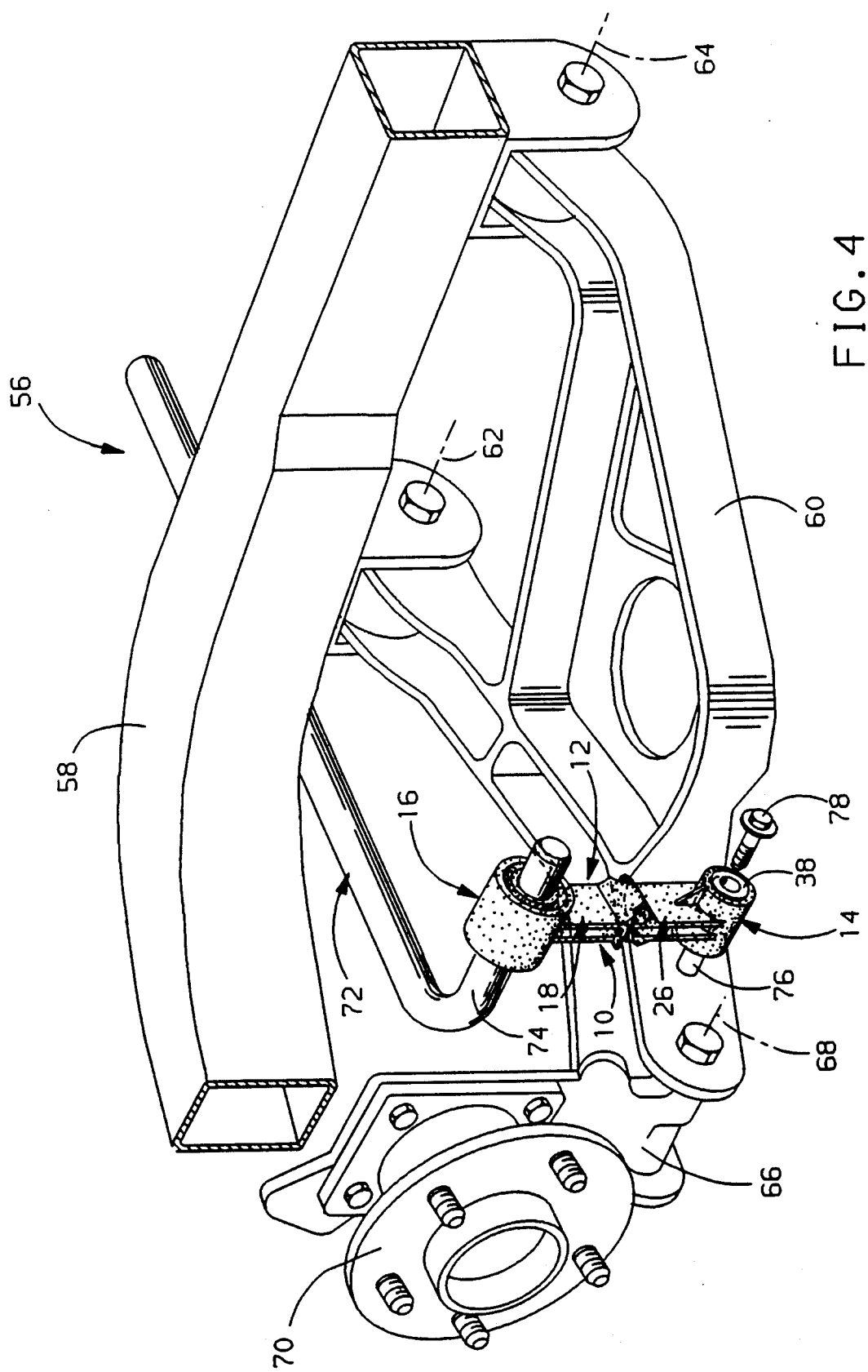
FIG. 4 is a perspective view of a vehicle suspension system incorporating the link assembly of FIG. 1 connected between a stabilizer bar and a control arm.

A link assembly indicated generally at 10 is illustrated in FIGS. 1 and 2. The link assembly 10 includes a jointed arm indicated generally at 12 terminating in a barrel portion 14 at its first end and a collar portion 16 at its second end. Preferably, the arm 12, the barrel portion 14 and the collar portion 16 are integrally molded from a suitable flexible and resilient material, e.g., glass-filled nylon or acetal.

The arm 12 includes an upper portion 18 formed by parallel side walls 20,22 joined by a connector 23 and an end wall 24 at innermost ends and connected to the collar portion 16 at outermost ends. A lower portion 26 is formed by parallel side walls 28,30 joined by a connector 31 and an end wall 32 at innermost ends and connected to the barrel portion 14 at outermost ends. A flexible hinge 34 (FIG. 2) connects side walls 20 and 28. On the opposite side, a flexible hinge 36 connects side walls 22 and 30. The hinges 34,36 permit relative twisting and angular displacement of the upper portion 18 with respect the lower portion 26 as described below.

A steel sleeve 38 can be fitted into the barrel portion 14 if desired. As illustrated best in FIG. 2, ribs 40,42 can be provided and integrally molded to strengthen the connection between the side walls 28,30 and the barrel portion 14.

The fitted collar portion 16 of the link assembly 10 is formed by an inner cylinder 44 mounted concentrically within an outer cylinder 46. The inner cylinder 44 is flexibly connected to the outer cylinder 46 by an annular connecting wall 48. As described below, the inner cylinder 44 can be angularly displaced with respect to the outer cylinder 46 through the flexible connecting wall 48 and an annular chamber 50 formed between the cylinders 44,46 as described below. If desired, ribs 52 and 54 can be provided and integrally molded to strengthen the connection between the side walls 20,22 and the collar portion 16.

A vehicle suspension system indicated generally at 56 incorporating the link assembly 10 of FIGS. 1-3 is partially illustrated in FIG. 4. A rigid frame 58 is aligned with the longitudinal axis of a vehicle. A control arm 60 is pivotally connected to the frame 58 at a first end by pivot axes 62 and 64. At the opposite end, the control arm 60 is pivotally connected to a knuckle 66 at pivot axis 68. A hub and bearing assembly 70 is mounted on the knuckle 66 and mounts a wheel assembly (not illustrated) in a conventional manner. As a wheel assembly travels up and down due to road surface inputs, the control arm 60 pivots with respect to the frame 58 in a well-known manner.

The link assembly 10 is mounted between and connects the control arm 60 and a tubular stabilizer bar 72. The inner cylinder 44 of the collar portion 16 receives a bent end 74 of the stabilizer bar 72. The inner cylinder 44 resiliently stretches to receive the bent end 74 and is retained by a friction fit.

The barrel portion 14 of the link assembly 10 is slidably received over a mounting boss 76 provided on the control arm 60 and is held in place by a fastener 78.

During operation, the control arm 60 pivots with respect to the frame 58 due to inputs through the hub and bearing assembly 70 from a wheel. The link assembly 10 accommodates the rotation of the stabilizer bar 72 which results in the angular movement of the bent end 74 as illustrated in FIG. 5. Two degrees of deformation are provided by the link assembly 10 to provide a desirable working angle. First, the hinges 34,36 of the arm 12 flex when the bent end 74 pivots. Additional compliance is the result of an angular displacement of the inner cylinder 44 with respect to the outer cylinder 48 provided by the connecting wall 48 and the annular chamber 50.

The present link assembly 10 provides an economical improved linkage which is adaptable for conventional suspension systems. Previously utilized eyeforms and bolts are not required to connect a stabilizer bar with a linkage.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A flexible and resilient link assembly for connecting a control arm and a tubular stabilizer bar of a vehicle suspension system, the link assembly comprising:
   (a) a jointed arm having first and second portions pivotal with respect to one another;
   (b) a collar portion including an outer cylinder connected to the first portion of the arm and an inner cylinder concentrically mounted within the outer cylinder by a flexible annular wall for receiving the stabilizer bar;
   (c) means for connecting the second portion of the arm to the control arm.

2. The link assembly specified in claim 1 including an annular chamber between the inner and outer cylinders to permit angular displacement of the inner cylinder with respect to the outer cylinder.

3. The link assembly specified in claim 1 wherein the arm, the collar portion and the barrel portion are integrally molded.

4. The link assembly specified in claim 1 wherein the outer and inner cylinders and annular wall are formed as an integrally molded construction.

5. The link assembly specified in claim 1 wherein the means for connecting the second portion of the arm includes a barrel portion provided on the second portion.

6. A suspension for a vehicle, comprising
   (a) means for mounting a wheel assembly;
   (b) a control arm pivotally connected to the wheel assembly mounting means;
   (c) means for pivotally mounting the control arm to a vehicle frame;
   (d) a tubular stabilizer bar having a central elongated portion and at least one bent end; and
   (e) a link assembly, for connecting the stabilizer bar to the control arm, having
      (i) a jointed arm having first and second portions pivotal with respect to one another;
      (ii) a collar portion including an outer cylinder connected to the first portion of the arm and an inner cylinder concentrically mounted within the outer cylinder by a flexible annular wall for receiving the stabilizer bar; and
      (iii) a barrel portion connected to the second portion of the arm for connection with the control arm.

7. The suspension system specified in claim 6 wherein the arm, the barrel portion and the collar portion are integrally molded.

* * * * *